(12) United States Patent
Doncel

(10) Patent No.: US 10,235,131 B2
(45) Date of Patent: Mar. 19, 2019

(54) COMMUNALLY CONSTRUCTED AUDIO HARMONIZED ELECTRONIC CARD

(71) Applicant: Web Resources, LLC, Miami Beach, FL (US)

(72) Inventor: Ignacio Doncel, Miami Beach, FL (US)

(73) Assignee: WEB RESOURCES, LLC, Miami Beach, FL (US)

( * ) Notice: Subject to any disclaimer, the term of this patent is extended or adjusted under 35 U.S.C. 154(b) by 197 days.

(21) Appl. No.: 15/058,136

(22) Filed: Mar. 1, 2016

(65) Prior Publication Data

US 2017/0109130 A1    Apr. 20, 2017

Related U.S. Application Data

(60) Provisional application No. 62/242,016, filed on Oct. 15, 2015.

(51) Int. Cl.

| | |
|---|---|
| *G06F 3/00* | (2006.01) |
| *G06F 3/16* | (2006.01) |
| *G06Q 10/10* | (2012.01) |
| *H04L 12/58* | (2006.01) |
| *H04L 29/08* | (2006.01) |
| *H04W 4/12* | (2009.01) |
| *G10H 1/38* | (2006.01) |

(52) U.S. Cl.
CPC ........... *G06F 3/167* (2013.01); *G06Q 10/107* (2013.01); *G10H 1/38* (2013.01); *H04L 51/10* (2013.01); *H04L 67/02* (2013.01); *H04W 4/12* (2013.01); *G10H 2240/165* (2013.01); *G10H 2240/175* (2013.01)

(58) Field of Classification Search
CPC ............ G06F 3/16; H04L 12/58; H04L 29/08
See application file for complete search history.

(56) References Cited

U.S. PATENT DOCUMENTS

| | | | |
|---|---|---|---|
| 5,857,171 A | 1/1999 | Kageyama et al. | |
| 6,295,058 B1* | 9/2001 | Hsu ...................... | G06Q 10/107 715/201 |
| 2003/0035412 A1* | 2/2003 | Wang ...................... | H04L 51/38 370/352 |
| 2006/0165240 A1 | 7/2006 | Bloom et al. | |
| 2007/0094328 A1 | 4/2007 | Birch | |

(Continued)

*Primary Examiner* — Stephen S Hong
*Assistant Examiner* — Marshon L Robinson
(74) *Attorney, Agent, or Firm* — Steven M. Greenberg, Esq.; Shutts & Bowen LLP

(57) ABSTRACT

A method for the communal construction of an audio harmonized electronic card includes loading a greeting card template in response to a request by an initial author. The method also includes receiving a voice track of the initial user along with a textual message and a designated recipient of an electronic card. The method yet further includes transmitting an invitation to a subsequent user with an embedded reference to the loaded card template. Thereafter, a voice track of the subsequent user is received from the subsequent user. Consequently, the voice tracks are composited into a single harmonized audio track with each of the voice tracks providing harmony to the other. An electronic card is then generated by embedding the textual message and the harmonized audio track into the loaded card template. Finally, the electronic card is transmitted to the designated recipient.

14 Claims, 2 Drawing Sheets

(56) References Cited

U.S. PATENT DOCUMENTS

| | | | | |
|---|---|---|---|---|
| 2007/0226305 A1* | 9/2007 | Bui | .................... | G06Q 10/107 709/206 |
| 2010/0088582 A1* | 4/2010 | Toyama | ............ | G06F 17/30056 715/201 |
| 2011/0219940 A1* | 9/2011 | Jiang | .................... | G10H 1/0025 84/622 |
| 2013/0262967 A1* | 10/2013 | Dreher | .................... | G06F 17/24 715/202 |
| 2014/0337761 A1* | 11/2014 | Glass | .................. | H04L 65/403 715/753 |
| 2015/0106225 A1* | 4/2015 | Glass | .................... | G06Q 20/12 705/26.7 |

\* cited by examiner

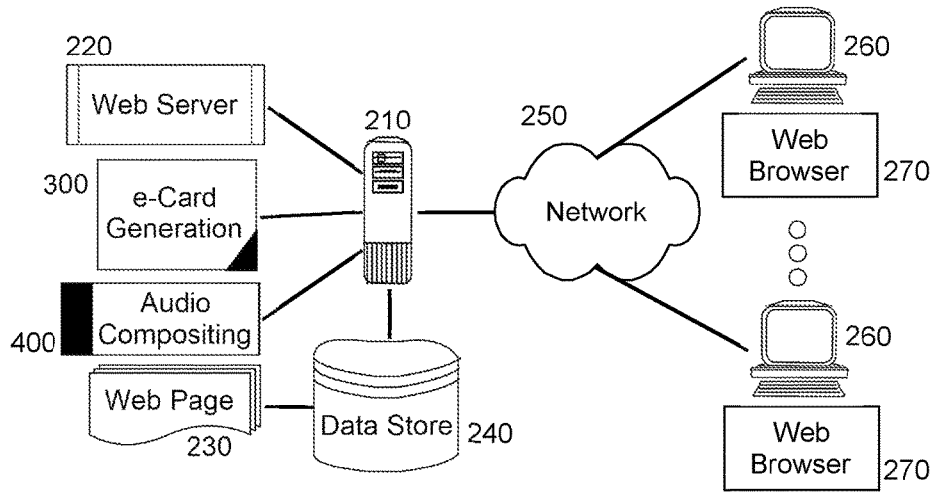
FIG. 2
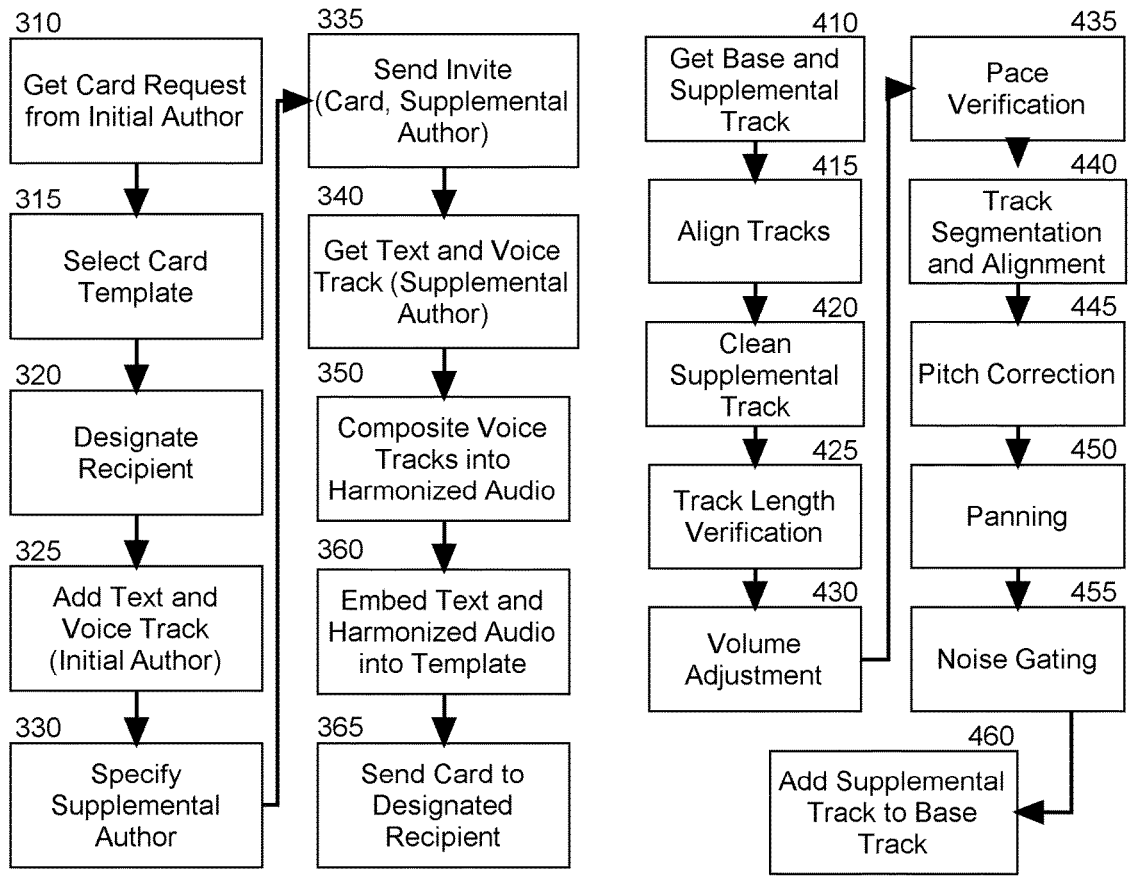
FIG. 3
FIG. 4

COMMUNALLY CONSTRUCTED AUDIO HARMONIZED ELECTRONIC CARD

CROSS-REFERENCE TO RELATED APPLICATION

This application claims the benefit of presently U.S. Provisional Patent Application No. 62/242,016 filed on Oct. 15, 2015, the entire teachings of which are incorporated herein by reference.

BACKGROUND OF THE INVENTION

Field of the Invention

The present invention relates to electronic cards including electronic greeting cards.

Description of the Related Art

An electronic card, otherwise known as an "e-card" or "e-greeting card" is an electronic form of a notice, postcard or greeting card, differing only in that unlike a traditional notice, postcard or greeting card, an electronic card is created digitally and delivered digitally without having been reduced to hardcopy from creation to delivery. Electronic greeting cards typically are developed through specialty Web sites either at no charge or at some minor cost utilizing digital design tools presented through the specialty Web sites. Once created, the specialty Web site coordinates the transfer of the newly created electronic greeting card to an intended recipient.

Typically, the author of an electronic card selects a card template from an on-line catalog of templates made available on the Web site of an electronic card Web site. Subsequently, the author completes the template so as to personalize the electronic card. The completion of the template may include not only the addition of a textual message, but also the addition of a photographic image, a video or audio—typically a song. Finally, the author may address the completed electronic card with the e-mail address of the intended recipient so that the Web site may then transmit the electronic card to the intended recipient.

The basic nature of the electronic card has improved over time to include many advanced features. One advanced feature is the provisioning of a gift card or gift certificate in conjunction with the transmission of an electronic greeting card to an intended recipient. Another advanced feature is the group electronic greeting card in which a single gift is presented by multiple individuals "signing" the electronic greeting card, or in which multiple individuals add different message content to a singular electronic greeting card prior to the transmission of the group electronic greeting card to the intended recipient.

BRIEF SUMMARY OF THE INVENTION

Embodiments of the present invention address deficiencies of the art in respect to electronic cards and provide a novel and non-obvious method, system and computer program product for a communally constructed audio harmonized electronic card. In an embodiment of the invention, a method for the communal construction of an audio harmonized electronic card includes loading a card template into memory of a host computer in response to a request by an initial author received in the memory from over a computer communications network. The method also includes receiving in the memory from the initial user, a voice track of the initial user along with a textual message and a designated recipient of an electronic card. The method yet further includes transmitting over the computer communications network from the computer an invitation to a subsequent user with an embedded reference to the loaded card template.

Thereafter, a voice track of the subsequent user is received in the memory from the subsequent user from over the computer communications network. Consequently, the voice tracks are composited into a single harmonized audio track with each of the voice tracks providing harmony to the other. An electronic card is then generated by embedding the textual message and the harmonized audio track into the loaded card template. Finally, the electronic card is transmitted by the computer over the computer communications network to the designated recipient.

In one aspect of the embodiment, the textual message is a handwritten message. In another aspect of the embodiment, the textual message is a typewritten message. In yet another aspect of the embodiment, an additional textual message is received from the subsequent user and embedded into the electronic card. Finally, in even yet another aspect of the embodiment, a gift card is defined within the electronic card by one of the initial user and the subsequent user.

In another embodiment of the invention, a data processing system is configured for the communal construction of an audio harmonized electronic greeting card. The system includes a host computing system including one or more computers, each with memory and at least one processor. The data processing system also includes a Web server executing in the host computing system and serving Web pages defining an electronic card Web site to requesting end users over a computer communications network. Finally, the data processing system includes a greeting card generation module coupled to the Web server and executing in the memory of the host computing system.

The module includes computer program instructions enabled to load into memory a card template in response to a request received in the Web site by an initial author, to receive through the Web site from the initial user, a voice track of the initial user along with a textual message and a designated recipient of an electronic card, to transmit over the computer communications network from the Web site an invitation to a subsequent user with an embedded reference to the loaded card template, to receive in the Web site from the subsequent user from over the computer communications network, a voice track of the subsequent user, to composite the voice tracks into a single harmonized audio track with each of the voice tracks providing harmony to the other, to generate the electronic card by embedding the textual message and the harmonized audio track into the loaded card template, and to transmit the electronic card from the Web site over the computer communications network to the designated recipient.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 2 is a schematic illustration of a data processing system configured for communal construction of an audio harmonized electronic card;

FIG. 3 is a flow chart illustrating a process for the communal construction of an audio harmonized electronic card; and, FIG. 4 is a flow chart illustrating a process for the composition of different voice tracks into a single, harmonized audio track.

DETAILED DESCRIPTION OF THE INVENTION

Figure 1:
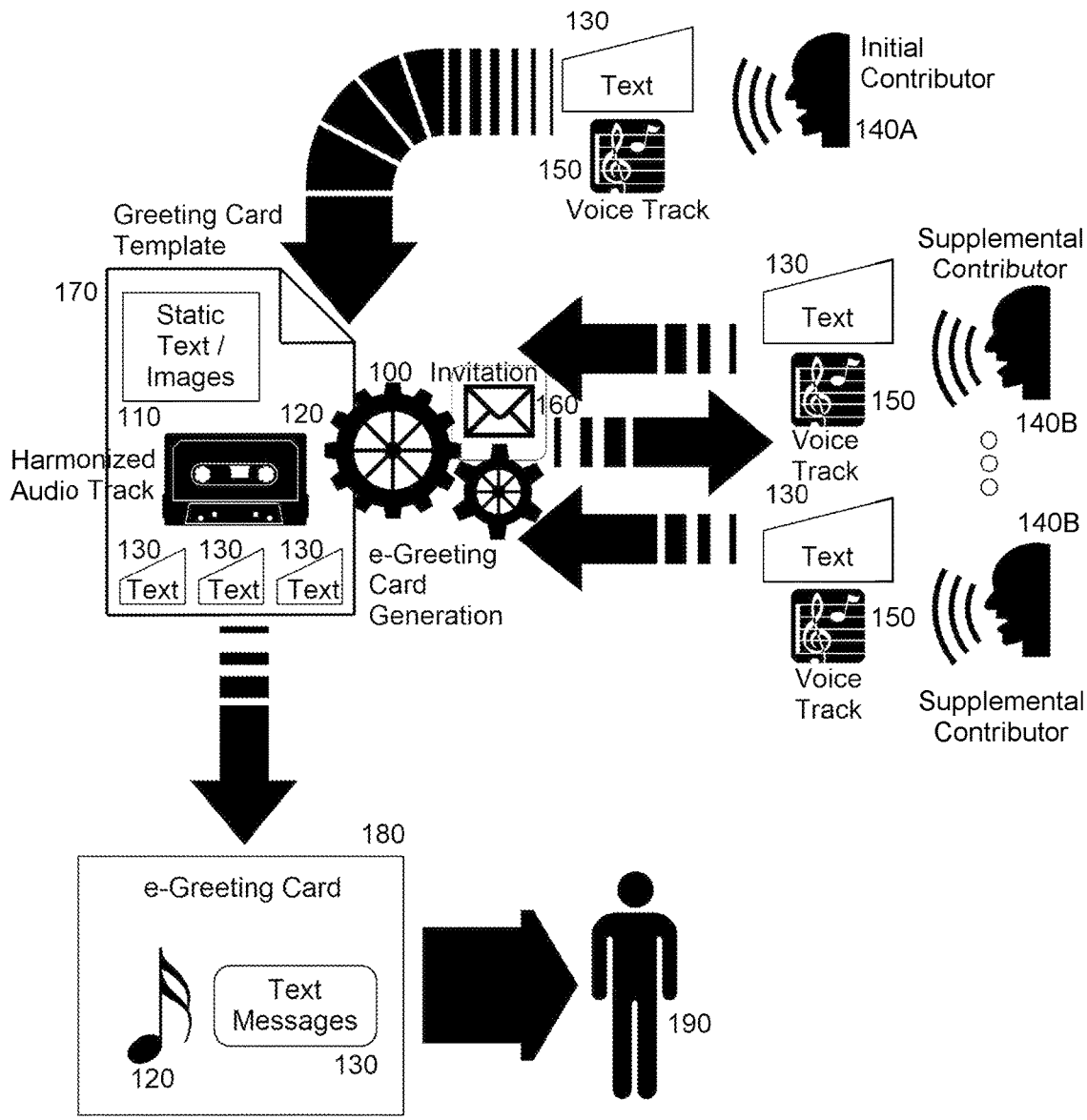
FIG. 1 is a pictorial illustration of a process for the communal construction of an audio harmonized electronic card.

Embodiments of the invention provide for the communal construction of an audio harmonized electronic card. In accordance with an embodiment of the invention, a card template for a notice, postcard or greeting card is completed by an initial author to include both a textual message and also a voice track recorded by the initial author. Thereafter, the initial author designates at least one other subsequent author to augment the completed card template with an additional voice track. The voice tracks are then combined into a single audio file and time adjusted to create a harmonic composition of the voice tracks. Finally, an electronic card is generated from the completed card template and the single audio track is transmitted as part of the electronic card to a designated recipient.

In further illustration, FIG. 1 pictorially shows a process for the communal construction of an audio harmonized electronic card, by way of example, an electronic greeting card. As shown in FIG. 1, in response to a request by an initial contributor 140A, e-greeting card generation logic 100 selects a card template 170 from which an e-greeting card 180 is generated. The card template 170 includes static text and imagery 110 and permits the insertion of additional text messages 130 as well as at least one harmonized audio track 120. In this regard, the initial contributor 140A provides to the e-greeting card generation logic 100 by way of an end user computing device such as a computer with a Web browser, a mobile computing device with a Web browser, or a mobile computing device with an application client, both text 130 such as a greeting message and a voice track 150 that includes recorded audio of the initial contributor 140A—for instance a recording of the initial contributor 140A speaking, singing or both. As well, the initial contributor 140A specifies to the e-greeting card generation logic 100 one or more supplemental contributors 140B.

The e-greeting card generation logic 100 then provides an invitation message 160 to each specified supplemental contributor 140B. The invitation message 160 is transmitted by electronic mail or text message to each specified supplemental contributor 140B and includes a reference such as a hyperlink to the greeting card template 170 with the text 130 already provided by the initial contributor 140A. Upon receipt of the invitation message 160, each supplemental contributor 140B also provides to the e-greeting card generation logic 100 text 130 and a voice track 150 that includes recorded audio of the supplemental contributor 140B—for instance a recording of the supplemental contributor 140B speaking, singing or both.

The e-greeting card generation logic 100 then performs audio harmonization of the voice tracks 150 in order to produce the harmonized audio track 120. In particular, each voice track 150 is aligned with one another, filtered for volume control, pitch corrected, panned to ensure proper voice distribution and noise gated before composited into a single audio track. Thereafter, the e-greeting card generation logic 100 persists the completed greeting card template 170 with static text and imagery 110, harmonized audio track 120 and contributed text 130 into a completed e-greeting card 180 in which the text messages 130 of the contributors 140A, 140B may be viewed and in which the harmonized audio track 120 may be played back to a designated recipient 190 of the e-greeting card 180.

The process described in connection with FIG. 1 may be implemented in a data processing system. In yet further illustration, FIG. 2 schematically depicts a data processing system configured for communal construction of an audio harmonized electronic card. The system includes a host computing system 210 that includes one or more computers, each with memory and at least one processor. The host computing system 210 supports the operation of a Web server 220 serving Web pages 230 in data store 240 to different Web browsers 270 executing in different computing devices 260 from over computer communications network 250. In this regard, each of the different computing devices 260 may include a desktop personal computer, a laptop or notebook computer, a tablet computing device or a smart phone to name just a few examples. As well, in lieu of a Web browser 270, the smart phone or tablet computer may include a mobile application providing an interface to an e-card generation module 300.

More specifically, the system also includes an e-card generation module 300. The e-card generation module 300 includes program code that when executing in the memory of the host computing system 210 receives multiple different voice tracks from multiple different contributors through one of the Web pages 230 provided to the different Web browsers 270. The program code of the e-card generation module 300 additionally receives text from the multiple different contributors. Thereafter, through the use of an audio compositing process 400, the program code of the e-card generation module 300 composites the received voice tracks into a single harmonized audio track and inserts the single harmonized audio track into a selected template for an e-greeting card. As well, the program code of the e-card generation module 300 inserts the received text into the selected template and then transmits over the computer communications network a copy of the template with audio track and text to a designated recipient as an e-greeting card.

In yet further illustration of the operation of the e-greeting card generation module 300, FIG. 3 is a flow chart illustrating a process for the communal construction of an audio harmonized electronic greeting card. Beginning in block 310, a card generation request to generate an e-greeting card from a template is received from an initial contributor and in block 315, a particular template for the e-greeting card is selected by the initial contributor. Thereafter, in block 320 a recipient for the e-greeting card is specified. In block 325, both text and a voice track is uploaded for inclusion in the e-greeting card by the initial contributor and in block 330, a supplemental contributor is specified by the initial contributor, for example by name and e-mail address.

In block 335, an invitation message is transmitted to the e-mail address of the supplemental contributor including therein a hyperlink to the selected template. In block 340, both text and a voice track is uploaded by the supplemental contributor for inclusion in the e-greeting card. Subsequently, in block 350 the voice track of the initial contributor and the voice track of the supplemental contributor are harmonized and composited into a single audio track. In this regard, in reference to FIG. 4, in block 410 the voice track of the initial contributor and the voice track of the supplemental contributor are loaded into memory.

Thereafter, in block 415, the voice tracks are initially aligned by aligning the starting position of the voice track of the supplemental contributor to the starting position of the voice track of the initial contributor and in block 420, initial delays or silence are removed from the voice track of the supplemental contributor. In block 425, the voice track of the supplemental contributor is compared to the track length of the voice track of the initial contributor and the voice track of the supplemental contributor is trimmed when required to permit only a maximum difference in track lengths between both voice tracks. Also, in block 430, audio in the voice track of the supplemental contributor having a threshold difference in volume from a volume of the voice track of the initial contributor are attenuated and matched to the volume of the voice track of the initial contributor. Finally, in block 435 a rhythm of the voice track of the supplemental contributor is compared to a rhythm of the voice track of the initial contributor and, to the extent that a threshold difference in rhythm is detected, the voice track of the supplemental contributor is filtered to more closely match the rhythms.

In block 440, the voice tracks are then prepared from compositing initially with the alignment of the voice tracks by dividing each voice track into segments and adjusting each segment of the voice track of the supplemental contributor to align with a corresponding segment of the voice track of the initial. The adjustment, for instance, may be performed by anchoring the peaks and valleys of the voice track of the supplemental contributor forcing those peaks and valleys to coincide with the peaks and valleys of the corresponding segments of the voice track of the initial contributor.

In block 445, a pitch correction process is performed in which the pitch of the voice track of the supplemental contributor is raised or lowered to coincide with that of the voice track of the initial contributor. In block 450, a panning process likewise is applied to ensure the acoustic distribution of voices in each voice track within a perceived distinct audible space. Finally, in block 455, the voice tracks are subjected to gating in which external noise present between spoken sentences or words is attenuated, thus improving the possibility of successful subsequent alignments for additional voice tracks from yet additional supplemental contributors. Finally, in block 460 the voice track of the supplemental contributor is physically added to the voice track of the initial contributor to produce a single audio track.

Returning now to FIG. 3, in block 360 the single audio track is embedded along with the text into the selected template. Finally, in block 365 a copy of the selected template with the text and audio track is transmitted to the designated recipient. Alternatively, a derivate document based upon the selected template with the text and the audio track is transmitted to the designated recipient as the e-greeting card to the extent that the e-greeting card is an augmented and enhanced form of the selected template with text and audio track.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for the communal construction of an audio harmonized electronic card, comprising:

loading a card template into memory of a host computer in response to a request by an initial author received in the memory from over a computer communications network;

receiving in the memory from the initial first user, a voice track of the initial user along with a textual message and a designated recipient of an electronic card;

transmitting over the computer communications network from the computer an invitation to a subsequent second user that is different than the first user with an embedded reference to the loaded card template;

receiving in the memory from the subsequent second user that is different than the first user from over the computer communications network, a voice track of the subsequent user;

compositing the voice tracks from both the initial first user and the subsequent second user that is different than the first user into a single harmonized audio track with the voice track of the subsequent second user providing harmony to the voice track of the initial first user, the compositing comprising aligning the voice tracks with one another, filtering the aligned voice tracks for volume control, pitch correcting the filtered and aligned voice tracks, panning the pitch corrected voice tracks to ensure proper voice distribution and noise gating the panned pitch corrected voice tracks before compositing the noise gated panned pitch corrected voice tracks into the single harmonized audio track;

generating the electronic card by embedding the textual message and the harmonized audio track into the loaded card template; and, transmitting the electronic card by the computer over the computer communications network to the designated recipient.

2. The method of claim 1, wherein the textual message is a handwritten message.

3. The method of claim 1, wherein the textual message is a typewritten message.

4. The method of claim 1, wherein an additional textual message is received from the subsequent user and embedded into the electronic card.

5. A data processing system configured for the communal construction of an audio harmonized electronic card, the system comprising:

a host computing system comprising one or more computers, each with memory and at least one processor;

a Web server executing in the host computing system and serving Web pages defining an electronic card Web site to requesting end users over a computer communications network; and, a card generation module coupled to the Web server and executing in the memory of the host computing system, the module comprising computer program instructions enabled to load into memory a card template in response to a request received in the Web site by an initial first user, to receive through the Web site from the initial first user, a voice track of the initial first user along with a textual message and a designated recipient of an electronic card, to transmit over the computer communications network from the Web site an invitation to a subsequent second user that is different than the initial first user with an embedded reference to the loaded card template, to receive in the Web site from the subsequent second user that is different than the initial first user from over the computer communications network, a voice track of the subsequent second user that is different than the initial first user, to composite the voice tracks from both the initial first user and the subsequent second user that is different than the first user into a single harmonized audio track with the voice track of the subsequent second user providing harmony to the voice track of the initial first user, the compositing comprising aligning the voice tracks with one another, filtering the aligned voice tracks for volume control, pitch correcting the filtered and aligned voice tracks, panning the pitch corrected voice tracks to ensure proper voice distribution and noise gating the panned pitch corrected voice tracks before compositing the noise gated panned pitch corrected voice tracks into the single harmonized audio track, to generate the electronic card by embedding the textual message and the harmonized audio track into the loaded card template, and to transmit the electronic card from the Web site over the computer communications network to the designated recipient.

6. The system of claim 5, wherein the textual message is a handwritten message.

7. The system of claim 5, wherein the textual message is a typewritten message.

8. The system of claim 5, wherein an additional textual message is received from the subsequent user and embedded into the electronic card.

9. The system of claim 5, wherein a gift card is defined within the electronic card by one of the initial user and the subsequent user.

10. A computer program product for the communal construction of an audio harmonized electronic greeting card, the computer program product comprising a computer readable storage medium having program instructions embodied therewith, the program instructions executable by a device to cause the device to perform a method comprising:

loading a card template into memory of a host computer in response to a request by an initial author received in the memory from over a computer communications network;

receiving in the memory from the initial user, a voice track of the initial user along with a textual message and a designated recipient of an electronic card;

transmitting over the computer communications network from the computer an invitation to a subsequent second user that is different than the first user with an embedded reference to the loaded card template;

receiving in the memory from the subsequent second user that is different than the first user from over the computer communications network, a voice track of the subsequent user;

compositing the voice tracks from both the initial first user and the subsequent second user that is different than the first user into a single harmonized audio track with the voice track of the subsequent second user providing harmony to the voice track of the initial first user, the compositing comprising aligning the voice tracks with one another, filtering the aligned voice tracks for volume control, pitch correcting the filtered and aligned voice tracks, panning the pitch corrected voice tracks to ensure proper voice distribution and noise gating the panned pitch corrected voice tracks before compositing the noise gated panned pitch corrected voice tracks into the single harmonized audio track;

generating the electronic card by embedding the textual message and the harmonized audio track into the loaded card template; and, transmitting the electronic card by the computer over the computer communications network to the designated recipient.

11. The computer program product of claim 10, wherein the textual message is a handwritten message.

12. The computer program product of claim 10, wherein the textual message is a typewritten message.

13. The computer program product of claim 10, wherein an additional textual message is received from the subsequent user and embedded into the electronic card.

14. The computer program product of claim 10, wherein a gift card is defined within the electronic card by one of the initial user and the subsequent user.

* * * * *